US008587865B2

(12) United States Patent
Riedmann et al.

(10) Patent No.: US 8,587,865 B2
(45) Date of Patent: Nov. 19, 2013

(54) DEVICE FOR EXAMINING AND MANIPULATING MICROSCOPIC OBJECTS WITH COUPLED ILLUMINATION AND MANIPULATION LIGHT BEAMS

(75) Inventors: Juergen Riedmann, Brezfeld (DE); Ingo Boehm, Heidelberg (DE); Volker Leimbach, Ludwigshafen (DE); Heinrich Ulrich, Heidelberg (DE); Holger Birk, Meckesheim (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 1399 days.

(21) Appl. No.: 11/265,875

(22) Filed: Nov. 3, 2005

(65) Prior Publication Data

US 2006/0098275 A1    May 11, 2006

(30) Foreign Application Priority Data

Nov. 9, 2004 (DE) .......................... 10 2004 054 262

(51) Int. Cl.
*G02B 21/06* (2006.01)
(52) U.S. Cl.
USPC ......................................... 359/388; 359/385
(58) Field of Classification Search
USPC ....................................................... 359/388
See application file for complete search history.

(56) References Cited

U.S. PATENT DOCUMENTS

| 4,515,447 | A | * | 5/1985 | Weimer et al. | 359/388 |
| 5,689,109 | A | * | 11/1997 | Schutze | 250/251 |
| 6,094,300 | A | * | 7/2000 | Kashima et al. | 359/385 |
| 7,009,763 | B1 | * | 3/2006 | Wolleschensky | 359/385 |
| 2002/0020800 | A1 | | 2/2002 | Knebel et al. | |
| 2002/0021440 | A1 | * | 2/2002 | Knebel | 356/308 |
| 2004/0252370 | A1 | * | 12/2004 | Giardini et al. | 359/368 |

FOREIGN PATENT DOCUMENTS

| DE | 100 39 520 A1 | 2/2002 |
| DE | 102 33 549 A1 | 2/2004 |

\* cited by examiner

*Primary Examiner* — Arnel C Lavarias
(74) *Attorney, Agent, or Firm* — Patentbar International P.C.

(57) ABSTRACT

A device for examining and manipulating microscopic objects with a microscope having a light source that serves to illuminate the object, and which generates an illumination light beam that runs along and illumination beam path, that can be guided over or through the object by means of a beam deflector, with a detector to detect light emitted from the object that runs along the detection beam path, with a primary beam splitter, and with a light source, which generates a manipulation light beam that runs along an illumination beam path, that serves to manipulate the object.

6 Claims, 2 Drawing Sheets

DEVICE FOR EXAMINING AND MANIPULATING MICROSCOPIC OBJECTS WITH COUPLED ILLUMINATION AND MANIPULATION LIGHT BEAMS

RELATED APPLICATIONS

This application claims priority to German patent application number DE 10 2004 054 262.7, filed Nov. 9, 2004, which is incorporated herein by reference in its entirety.

BACKGROUND OF THE INVENTION

In scanning microscopy, an object to be examined is illuminated with a light beam in order to observe the reflection light or fluorescent light emitted by the sample. The focus of the illumination light beam is moved in an object plane with the help of a controllable beam deflector, generally by tipping two mirrors, whereby the axes of deflection are mostly positioned perpendicular to each other so that one mirror deflects in the x-direction and the other in the y-direction. The mirrors can, for example, be tipped with the help of galvanometric positioners. Measurement of the power of the light coming from the object is dependent on the scanning position of the illumination light beam.

In confocal scanning microscopy in particular, an object is scanned in three dimensions with the focus of a light beam.

A confocal scanning microscope generally comprises a light source, a focusing optic with which the light from the source is focused on a pinhole aperture—the so-called excitation aperture—, a primary beam splitter, a beam deflector to control the beam, a detection aperture, and at least one detector to detect detection light or fluorescent light that is emitted by the object. The primary beam splitter, via which the illumination light beam is coupled, is implemented such that the illumination light is largely reflected, whereas the reflection light and/or fluorescent light largely passes the primary beam splitter.

Category-defining devices that offer the possibility of object manipulation are used particularly in cell biology, for example, to manipulate the insides of unopened cells. Here, two different methods of manipulation, in particular, are usual. On the one hand, objects or object regions are illuminated with focused infrared light, as a result of which individual particles of the objects or object region, respectively, are captured in the proximity of the manipulation focus, and can then be moved in unison with the focus when the position of the manipulation focus is changed in the focal plane (optical tweezers), so that they may, for example, be impinged upon by a force. If an object region is impinged upon by a pulsed focused UV light, biological material can be cut or perforated as a result of the high energy density of UV light (nanoscalpel).

A multiplicity of other applications is known in scanning microscopy in which a manipulation light beam is used in addition to the illumination light beam for manipulating objects.

DE 100 39 520 A1 describes a device for examining and manipulating microscopic objects, in which the manipulation light beam and the illumination light beam are merged by means of a scanning mirror of a beam deflector. Here, the scanning mirror is designed to be transparent to the light from the manipulation light source, while reflecting the light from the illumination light source. The known device is disadvantageous to the extent that a total of two beam deflectors are needed, whereby one beam deflector controls the manipulation light beam, and the other beam deflector the illumination light beam. The need for two beam deflectors makes the known device both expensive to produce and time-consuming to operate because both beam deflectors must be precisely synchronized in order to keep the beam angle between the manipulation light beam and the illumination light beam constant during the entire scanning process.

A scanning microscope with a manipulation light beam and an illumination light beam is also known from DE 102 33 549 A1, whereby the merging of both light beams is done with the help of the primary beam splitter. The primary beam splitter serves primarily to separate the illumination light beam and the detection light beam. For this purpose, the primary beam splitter is generally implemented either as a band-pass filter or cut-off filter or as a partially transmitting neutral splitter that reflects the light of the illumination light beam and permits the light of the detection light beam to pass. Because the spectral edges of the beam splitter are not infinitely steep, but rather exhibit a certain slope, the wavelengths or wavelength ranges, respectively, of the illumination light, the detection light, and the manipulation light can, under certain circumstances when the manipulation light beam is also coupled, be selected only from a narrowly delimited range, to be precisely coordinated with the spectral characteristics of the primary beam splitter.

SUMMARY OF THE INVENTION

The object underlying the present invention is to disclose a device for examining and manipulating microscopic objects that enables flexible and reliable object manipulation while being of simple construction and requiring little effort to adjust.

The device according to the invention for examining and manipulating microscopic objects on the one hand solves the aforementioned object by comprising a light source to illuminate an object, which light source generates an illumination a light beam that propagates along an illumination beam path, the light beam being guided over or through an object by means of a beam deflector; a detector to detect the light emitted from the object that propagates along a detection beam path having a primary beam splitter; and as second light source to a manipulation light beam that propagates along a manipulation beam path and serves to manipulate the object, wherein the beam deflector, the primary beam splitter and an arrangement for coupling the manipulation light beam ate disposed in the illumination beam path. According to it, the category-defining device is characterized in that a device to couple the manipulation light beam is provided in the illumination beam path in addition to the beam deflector and the primary beam splitter.

In a manner according to the invention it was first recognized that a high degree of flexibility is achievable with regard to object manipulation by separating the coupling of the manipulation light beam both spatially and functionally from the beam deflector and the primary beam splitter. In a further manner according to the invention, such separation is achieved by providing an additional device in the illumination light beam that serves specifically to couple the manipulation light beam. As a result, it is possible, for example, to freely select the spectral characteristics of the illumination light beam over a large range, without having to take into consideration the spectral composition of the illumination light and the detection light.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
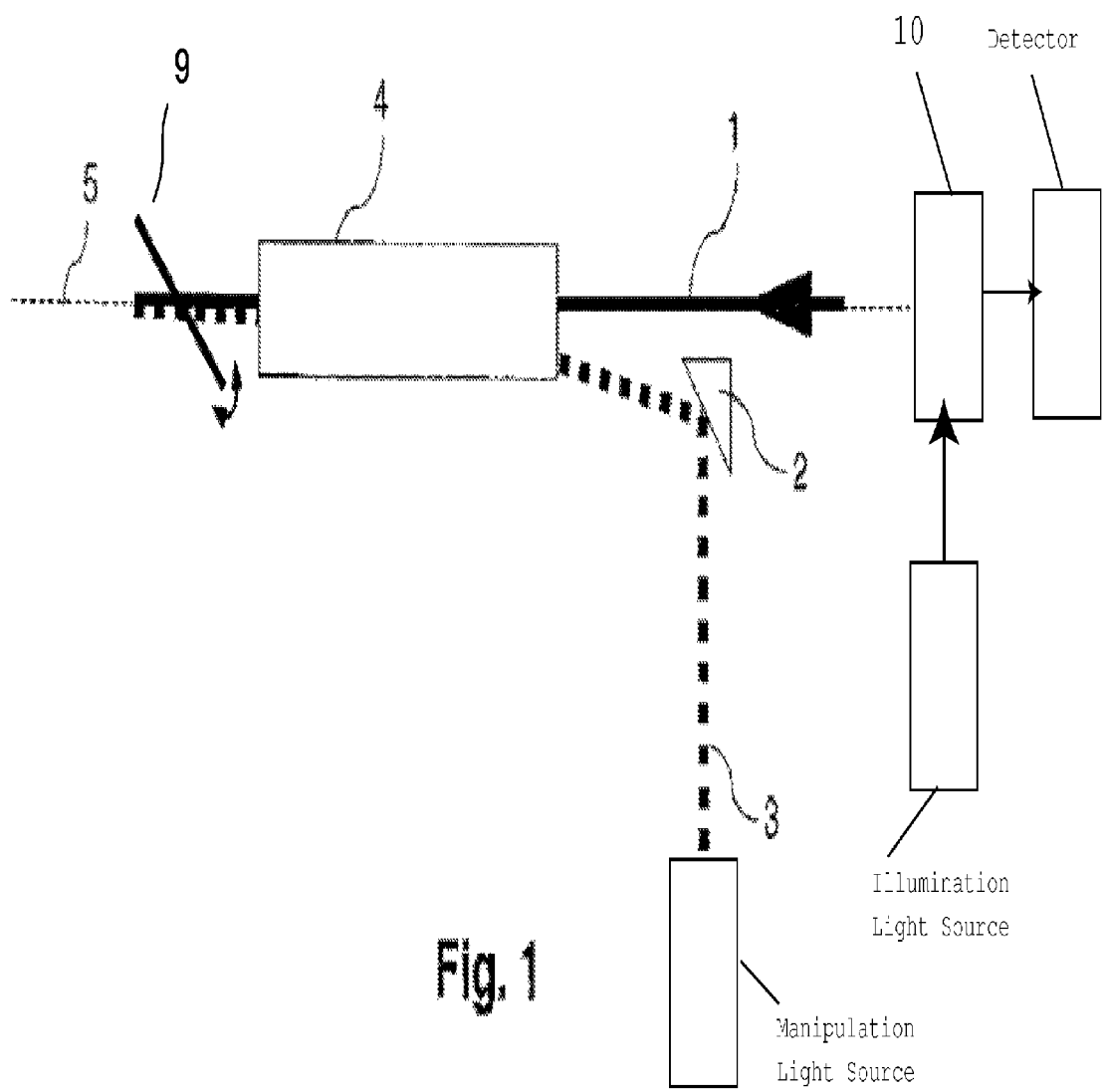
FIG. 1 a schematic representation of the first embodiment of a device according to the invention for examining and manipulating microscopic objects.

FIG. 1 shows a schematic of a part of a device according to the invention for examining and manipulating microscopic objects. An illumination light beam 1 coming from a primary beam splitter 10 is represented by a solid line. A mirror 2 is arranged at a distance from the illumination light beam 1, whereby the distance is selected such that the illumination light beam 1 is not influenced. A manipulation light beam 3 that serves to manipulate the object under examination is reflected by the mirror 2 and is redirected to an expansion optic 4. The expansion optic 4 comprises a number of lenses that are arranged such that they expand the illumination light beam 1 and the manipulation light beam 3 and simultaneously decrease the beam angle between the illumination light beam 1 and the manipulation light beam 3. The illumination light beam 1 and the manipulation light beam 3 thus exit the expansion optic 4 at a smaller beam angle, whereby the manipulation light beam 3 advances ahead of the illumination light beam 1. Both light beams 1, 3 are fed to a beam deflector 9 with which the light beams 1, 3 are directed over or through the object under examination.

It should be noted that the beam angle, and therefore the distance between the two light beams 1, 3 on the object, may be changed depending on the requirements of each actual application. For this purpose, either the mirror 2 may be rotated, or the expansion optic 4 or individual lenses comprising the expansion optic 4, respectively, may be moved along the optical axis 5.

Figure 2:
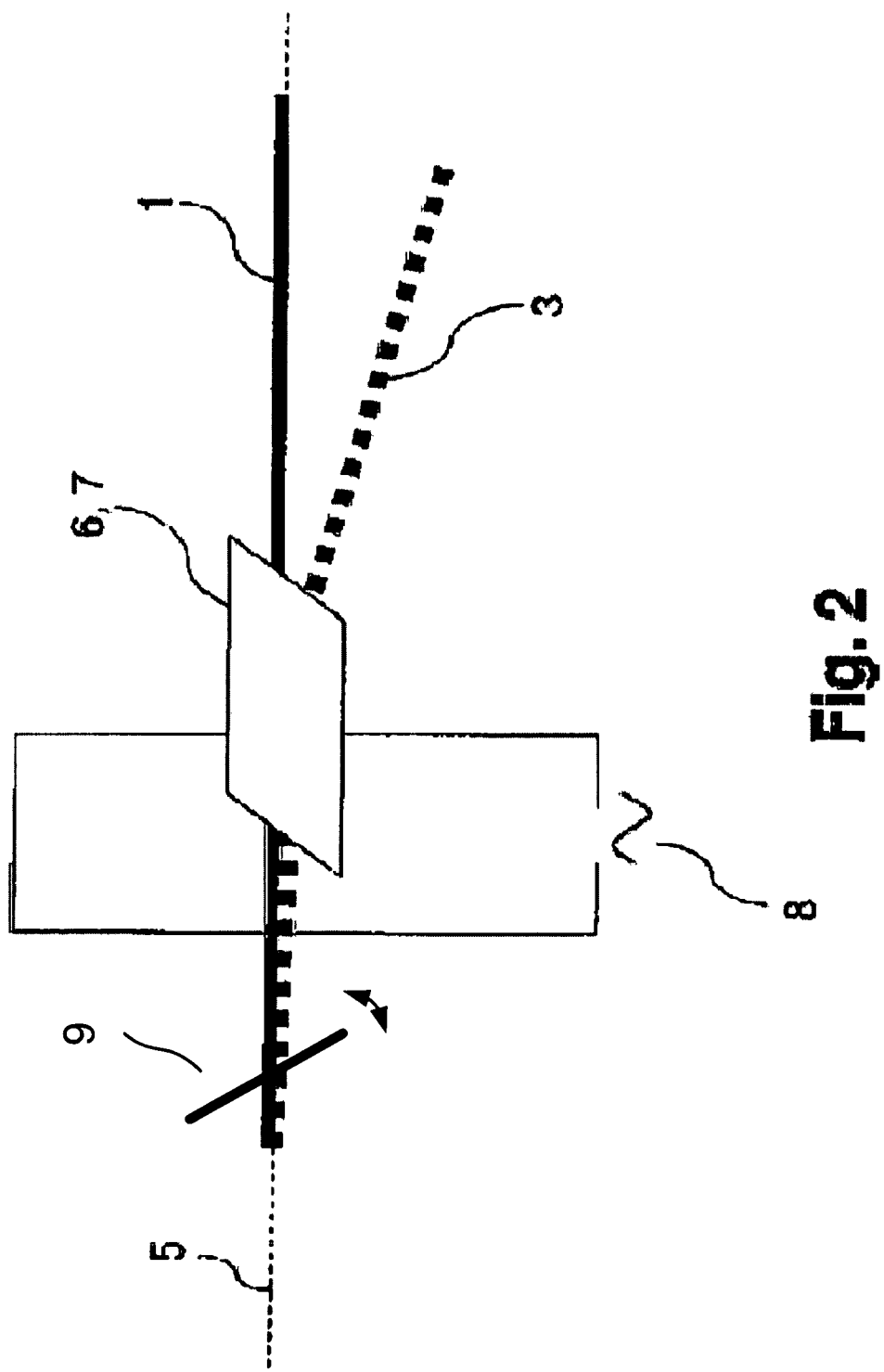
FIG. 2 a schematic representation of the second embodiment of the device according to the invention with an acousto-optical beam splitter.

FIG. 2 again shows a schematic representation of the illumination light beam 1 (solid line) as well as the manipulation light beam 3 that is to be coupled (broken line). An acousto-optical element 6, which is implemented as an AOBS 7, is arranged in the beam path of the illumination light beam 1. Depending on the high-frequency 8 applied to the acousto-optical element 6, specific wavelengths or wavelength regions can be purposefully influenced, while other wavelengths or wavelength ranges pass the acousto-optical element 6 unimpeded. In the device represented in FIG. 2, the AOBS is coordinated such that the illumination light beam 1 and the manipulation light beam 3 exit the AOBS 7 at a small relative beam angle, whereby, once again, the manipulation light beam 3 advances ahead of the illumination light beam 1. Both light beams 1, 3 are fed to a beam deflector 9 with which the light beams 1, 3 are directed over or through the object under examination.

Finally, it is stressed that the aforedescribed embodiments of the invention serve merely to clarify the claimed teaching, but are not limited to the embodiments of the invention.

In an advantageous embodiment of the invention the device for coupling the manipulation light beam is implemented as a beam splitter. Concretely, the beam splitter can be implemented such that it reflects the illumination light beam and transmits the manipulation light beam. The use of a beam splitter offers the advantage that both the relative beam angle at which both light beams strike the beam splitter and the lateral offset of both light beams can be selected at will over a wide range. The beam splitter can be arranged either in front of or behind the primary beam splitter.

In a preferred embodiment of the invention the device for coupling the manipulation light beam is implemented as a mirror with a connected expansion optic. Unwanted influences such as partial reflections, imaging errors, ghosts, interferences, etc., that can occur to both the transmitted and the reflected light beam when using a beam splitter can be largely avoided by implementing such a design. To avoid unwanted influences by the mirror on the illumination light beam, the mirror can be positioned such that it redirects the manipulation light beam such that the positioning of the mirror permits a sufficiently large distance to the optical axis. The expansion optic that is connected to the mirror, which largely comprises an arrangement of several lenses, can be implemented such that it lessens the beam angle between the illumination light beam and the manipulation light beam to whatever extent desired.

Adjustability of the mirror and/or of the expansion optic can be provided in a particularly advantageous manner so that the beam angle between the light beams exiting the expansion optic is adjustable as a result. Thus, the mirror may, for example, be rotatable and/or the expansion optic may be implemented so that it can be moved along the optical axis. A change in the beam angle results in a simultaneous change in the distance to the object with which the manipulation beam advances ahead of the illumination light beam.

In a further preferred embodiment of the invention, the device for coupling the manipulation light beam may be implemented as an acousto-optical element. The acousto-optical element may, for example, be arranged in the illumination beam path between the primary beam splitter and the beam deflector. The manipulation light beam can either be redirected directly to the acousto-optical element, or—as previously described in connection with the expansion optic—via a mirror. The acousto-optical element can be implemented as an acousto-optical beam splitter (AOBS) in a particularly advantageous manner.

The aforementioned object is further solved by a device comprising: a light source to illuminate an object, which light source generates an illumination a light beam that propagates along an illumination beam path, the light beam being guided over or through an object by means of a beam deflector; a detector to detect the light emitted from the object that propagates along a detection beam path having a primary beam splitter; a second light source to generate a manipulation light beam that propagates along a manipulation beam path and serves to manipulate the object; and an acousto-optical element serving to couple the manipulation light beam and being a component of the primary beam splitter disposed in the illumination beam path. According to it, the category-defining device is characterized in that the manipulation light beam may be coupled by means of an acousto-optical element, whereby the acousto-optical element is arranged in the illumination beam path as a component of the primary beam splitter.

In a manner according to the invention it was first recognized that a high degree of flexibility is achievable with regard to coupling the manipulation light beam even without additional components, namely, when an acousto-optical element is provided in the illumination light path to separate the illumination light beam and the detection light beam. In a further manner according to the invention, it was then recognized that the acousto-optical element may be switched—over and above the actual function of separating the illumination light beam and the detection light beam—so that it serves to couple the manipulation light beam. In the process, the device according to the invention makes use of the fact that, among other things, the acousto-optical element exhibits no "cut-off filter characteristics" and as a result enables high resolution control of the light beams.

Advantageously, the acousto-optical element is also an AOBS.

In a preferred embodiment of the invention, the AOBS may be switched such that—when suitably coupled in the AOBS—the manipulation light beam lies along the optical axis of the microscope. In this manner, an additional port for visible light can be made available in the scanning microscope. This port exhibits AOBS characteristics and may be configured depending on the requirements of actual applications.

There are several ways of advantageously configuring and developing the present invention. In this regard, reference is made to the descriptions of a preferred embodiment of the invention. The arrangement may be implemented as a beam splitter, or as a mirror with an attached expansion optic, or as an acousto-optical element, which may be an AOBS; the AOBS may be switched such that the manipulation light beam propagates along an optical axis of the microscope after passing the AOBS. The mirror and/or the expansion optic may be adjusted such that the beam angle between the illumination light beam and the manipulation light beam can be altered. In connection with the descriptions of the preferred embodiment of the invention based on the diagrams, preferred configurations and developments of the teaching are described in general terms based on the diagrams.

While this invention has been particularly shown and described with references to preferred embodiments thereof, it will be understood by those skilled in the art that various changes in form and details may be made therein without departing from the scope of the invention encompassed by the appended claims.

What is claimed is:

1. A device for examining and manipulating microscopic objects with a microscope, the device comprising:
    a first light source to illuminate an object, which first light source generates an illumination light beam that propagates along an illumination beam path, the illumination light beam being guided over or through an object by means of a beam deflector disposed in the illumination beam path;
    a detector to detect the light emitted from the object that propagates along a detection beam path having a primary beam splitter;
    a second light source to generate a manipulation light beam that propagates along a manipulation beam path and serves to manipulate the object; and
    an arrangement for coupling the manipulation light beam with the illumination light beam;
    wherein the arrangement for coupling the manipulation light beam with the illumination light beam is disposed in the illumination beam path;
    wherein the arrangement for coupling the manipulation light beam with the illumination light beam is implemented as a beam splitter, or as a mirror with an attached expansion optic, or as an acousto-optical element; and
    wherein manipulating of the object by the manipulation light beam is performed by the same beam deflector disposed in the illumination beam path guiding the manipulation light beam coupled with the illumination light beam.

2. The device according to claim 1, wherein the arrangement for coupling is implemented as a mirror with an attached expansion optic, wherein the mirror or the expansion optic may be adjusted such that the beam angle between the illumination light beam and the manipulation light beam can be altered.

3. The device according to claim 1, wherein the arrangement for coupling is implemented as an acousto-optical element, wherein the acousto-optical element is an acousto-optical beam splitter.

4. A device for examining and manipulating microscopic objects with a microscope, the device comprising:
    a first light source to illuminate an object, which first light source generates an illumination light beam that propagates along an illumination beam path, the illumination light beam being guided over or through an object by means of a beam deflector disposed in the illumination beam path;
    a detector to detect the light emitted from the object that propagates along a detection beam path having a primary beam splitter;
    a second light source to generate a manipulation light beam that propagates along a manipulation beam path and serves to manipulate the object; and
    an acousto-optical element serving to couple the manipulation light beam with the illumination light beam, the acousto-optical element being a component of the primary beam splitter disposed in the illumination beam path;
    wherein manipulating of the object by the manipulation light beam is performed by the same beam deflector disposed in the illumination beam path guiding the manipulation light beam coupled with the illumination light beam.

5. The device according to claim 4, wherein the acousto-optical element is an acousto-optical beam splitter.

6. The device according to claim 5, wherein the acousto-optical beam splitter may be switched such that the manipulation light beam propagates along an optical axis of the microscope after passing the acousto-optical beam splitter.

* * * * *